United States Patent
Cho et al.

(10) Patent No.: US 8,644,331 B2
(45) Date of Patent: Feb. 4, 2014

(54) METHOD AND APPARATUS FOR TRANSMITTING RANGING CHANNEL IN WIRELESS COMMUNICATION SYSTEM

(75) Inventors: HanGyu Cho, Seoul (KR); Jin Sam Kwak, Seoul (KR); HyunWoo Lee, Seoul (KR); Jinsoo Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 621 days.

(21) Appl. No.: 12/764,880

(22) Filed: Apr. 21, 2010

(65) Prior Publication Data
US 2010/0272043 A1    Oct. 28, 2010

Related U.S. Application Data

(60) Provisional application No. 61/171,462, filed on Apr. 22, 2009, provisional application No. 61/172,786, filed on Apr. 27, 2009, provisional application No. 61/225,888, filed on Jul. 15, 2009.

(30) Foreign Application Priority Data

Mar. 26, 2010   (KR) .................. 10-2010-0027438

(51) Int. Cl.
*H04J 4/00*    (2006.01)
(52) U.S. Cl.
USPC ........................................ 370/436
(58) Field of Classification Search
USPC .................. 370/310–350, 432, 436
See application file for complete search history.

(56) References Cited

U.S. PATENT DOCUMENTS

2005/0195791 A1 * 9/2005 Sung et al. ............. 370/342
2007/0232339 A1   10/2007 Ji et al.
2010/0290405 A1 * 11/2010 Arnott et al. ........... 370/329

FOREIGN PATENT DOCUMENTS

| JP | 2006520119 | 8/2006 |
| JP | 2007525929 | 9/2007 |
| JP | 2009130895 | 6/2009 |
| WO | 2008-002060 | 1/2008 |
| WO | 2008068888 | 6/2008 |

OTHER PUBLICATIONS

Japan Patent Office Application Serial No. 2012-501946, Office Action dated Feb. 4, 2013, 3 pages.

* cited by examiner

*Primary Examiner* — Ricky Ngo
*Assistant Examiner* — Wei-Po Kao
(74) *Attorney, Agent, or Firm* — Lee, Hong, Degerman, Kang & Waimey

(57) ABSTRACT

A method and apparatus for transmitting a ranging channel in a wireless communication system is provided. A mobile station (MS) receives frequency resource allocation information of a ranging channel and allocates the ranging channel to one ranging subband on a frequency domain determined based on the frequency resource allocation information of the ranging channel. The MS transmits the ranging channel. The frequency resource allocation information of the ranging channel includes a cell identifier (ID) of a cell and the number of allocated subbands or the number of allocated subband contiguous resource units (CRUs).

10 Claims, 14 Drawing Sheets

(a)  (b)

METHOD AND APPARATUS FOR TRANSMITTING RANGING CHANNEL IN WIRELESS COMMUNICATION SYSTEM

CROSS-REFERENCE TO RELATED APPLICATIONS

Pursuant to 35 U.S.C. §119(a), this application claims the benefit of earlier filing date and right of priority to Korean Patent Application No. 10-2010-0027438 filed on Mar. 26, 2010. This application further claims the benefit of U.S. Provisional application Nos. 61/171,462, filed on Apr. 22, 2009, 61/172,786 filed on Apr. 27, 2009 and No. 61/225,888 filed on Jul. 15, 2009, the contents of all of which are incorporated by reference in their entirety herein.

BACKGROUND OF THE INVENTION

1. Field of the Invention

The present invention relates to wireless communications, and more particularly, to a method and apparatus for transmitting a ranging channel in a wireless communication system.

2. Related Art

The institute of electrical and electronics engineers (IEEE) 802.16e standard was adopted in 2007 as a sixth standard for international mobile telecommunication (IMT)-2000 in the name of 'WMAN-OFDMA TDD' by the ITU-radio communication sector (ITU-R) which is one of sectors of the international telecommunication union (ITU). An IMT-advanced system has been prepared by the ITU-R as a next generation (i.e., $4^{th}$ generation) mobile communication standard following the IMT-2000. It was determined by the IEEE 802.16 working group (WG) to conduct the 802.16m project for the purpose of creating an amendment standard of the existing IEEE 802.16e as a standard for the IMT-advanced system. As can be seen in the purpose above, the 802.16m standard has two aspects, that is, continuity from the past (i.e., the amendment of the existing 802.16e standard) and continuity to the future (i.e., the standard for the next generation IMT-advanced system). Therefore, the 802.16m standard needs to satisfy all requirements for the IMT-advanced system while maintaining compatibility with a mobile WiMAX system conforming to the 802.16e standard.

Effective transmission/reception methods and utilizations have been proposed for a broadband wireless communication system to maximize efficiency of radio resources. An orthogonal frequency division multiplexing (OFDM) system capable of reducing inter-symbol interference (ISI) with a low complexity is taken into consideration as one of next generation wireless communication systems. In the OFDM, a serially input data symbol is converted into N parallel data symbols, and is then transmitted by being carried on each of separated N subcarriers. The subcarriers maintain orthogonality in a frequency dimension. Each orthogonal channel experiences mutually independent frequency selective fading, and an interval of a transmitted symbol is increased, thereby minimizing inter-symbol interference.

When a system uses the OFDM as a modulation scheme, orthogonal frequency division multiple access (OFDMA) is a multiple access scheme in which multiple access is achieved by independently providing some of available subcarriers to a plurality of users. In the OFDMA, frequency resources (i.e., subcarriers) are provided to the respective users, and the respective frequency resources do not overlap with one another in general since they are independently provided to the plurality of users. Consequently, the frequency resources are allocated to the respective users in a mutually exclusive manner. In an OFDMA system, frequency diversity for multiple users can be obtained by using frequency selective scheduling, and subcarriers can be allocated variously according to a permutation rule for the subcarriers. In addition, a spatial multiplexing scheme using multiple antennas can be used to increase efficiency of a spatial domain.

A ranging channel can be used for uplink synchronization. The ranging channel can be classified into a ranging channel for a non-synchronized MS and a ranging channel for a synchronized MS. The ranging channel for the non-synchronized MS can be used for initial access and handover. The ranging channel for the synchronized MS can be used for periodic ranging.

There is a need for a method of allocating resources of a ranging channel by considering a frequency partition (FP) and a subband (SB)/miniband (MB).

SUMMARY OF THE INVENTION

It is, therefore, an object of the present invention to provide a method and apparatus for transmitting a ranging channel in a wireless communication system.

In an aspect, an apparatus for transmitting a ranging channel in a wireless communication system is provided. The apparatus include a radio frequency (RF) unit configured to receive frequency resource allocation information of the ranging channel and transmit the ranging channel, and a processor coupled to the RF unit and configured to allocate the ranging channel to one ranging subband on a frequency domain determined based on the frequency resource allocation information of the ranging channel, wherein the frequency resource allocation information of the ranging channel comprises a cell identifier (ID) of a cell and the number of allocated subbands or the number of allocated subband contiguous resource units (CRUs). The ranging subband may have an index calculated by the equation $I_{SB}=\mathrm{mod}(\mathrm{cellID}, X_{SB})$, wherein $I_{SB}$ denotes subband indices $0, \ldots, X_{SB}-1$ on the frequency domain, cellID denotes the cell ID of the cell, $X_{SB}$ denotes the number of allocated subbands or the number of allocated subband CRUs, and $\mathrm{mod}(\mathrm{cellID}, X_{SB})$ is a remainder obtained by dividing the cell ID by $X_{SB}$. The cellID may be any integer ranging from 0 to 767. The number of allocated subbands or the number of allocated subband CRUs may be either broadcast or indicated by another signal. The number of allocated subbands may vary depending on a system bandwidth. The ranging subband may include a plurality of contiguous physical resource units (PRUs). The number of the plurality of contiguous PRUs may be 4.

In another aspect, a method for transmitting a ranging channel in a wireless communication system is provided. The method include receiving frequency resource allocation information of a ranging channel, allocating the ranging channel to one ranging subband on a frequency domain determined based on the frequency resource allocation information of the ranging channel, and transmitting the ranging channel, wherein the frequency resource allocation information of the ranging channel comprises a cell identifier (ID) of a cell and the number of allocated subbands or the number of allocated subband CRUs. The ranging subband may have an index calculated by the equation $I_{SB}=\mathrm{mod}(\mathrm{cellID}, X_{SB})$, wherein $I_{SB}$ denotes subband indices $0, \ldots, X_{SB}-1$ on the frequency domain, cellID denotes the cell ID of the cell, $X_{SB}$ denotes the number of allocated subbands or the number of allocated subband CRUs, and $\mathrm{mod}(\mathrm{cellID}, X_{SB})$ is a remainder obtained by dividing the cell ID by $X_{SB}$. The cellID may be any integer ranging from 0 to 767. The number of allocated subbands or the number of allocated subband CRUs may be either broadcast or indicated by another signal. The number of allocated subbands may vary depending on a system bandwidth. The ranging subband may include a plurality of contiguous PRUs. The number of the plurality of contiguous PRUs may be 4.

DESCRIPTION OF EXEMPLARY EMBODIMENTS

A technology below can be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA can be implemented using radio technology, such as Universal Terrestrial Radio Access (UTRA) or CDMA2000. TDMA can be implemented using radio technology, such as Global System for Mobile communications (GSM)/General Packet Radio Service (GPRS)/Enhanced Data Rates for GSM Evolution (EDGE). OFDMA can be implemented using radio technology, such as IEEE 802.11 (Wi-Fi), IEEE 802.16 (WiMAX), IEEE 802-20, or Evolved UTRA (E-UTRA). IEEE 802.16m is the evolution of IEEE 802.16e, and it provides a backward compatibility with an IEEE 802.16e-based system. UTRA is part of a Universal Mobile Telecommunications System (UMTS). 3rd Generation Partnership Project (3GPP) Long Term Evolution (LET) is part of Evolved UMTS (E-UMTS) using Evolved-UMTS Terrestrial Radio Access (E-UTRA), and it adopts OFDMA in downlink (DL) and SC-FDMA in uplink (UL). LTE-A (Advanced) is the evolution of 3GPP LTE.

IEEE 802.16m is chiefly described as an example in order to clarify the description, but the technical spirit of the present invention is not limited to IEEE 802.16e.

Figure 1:
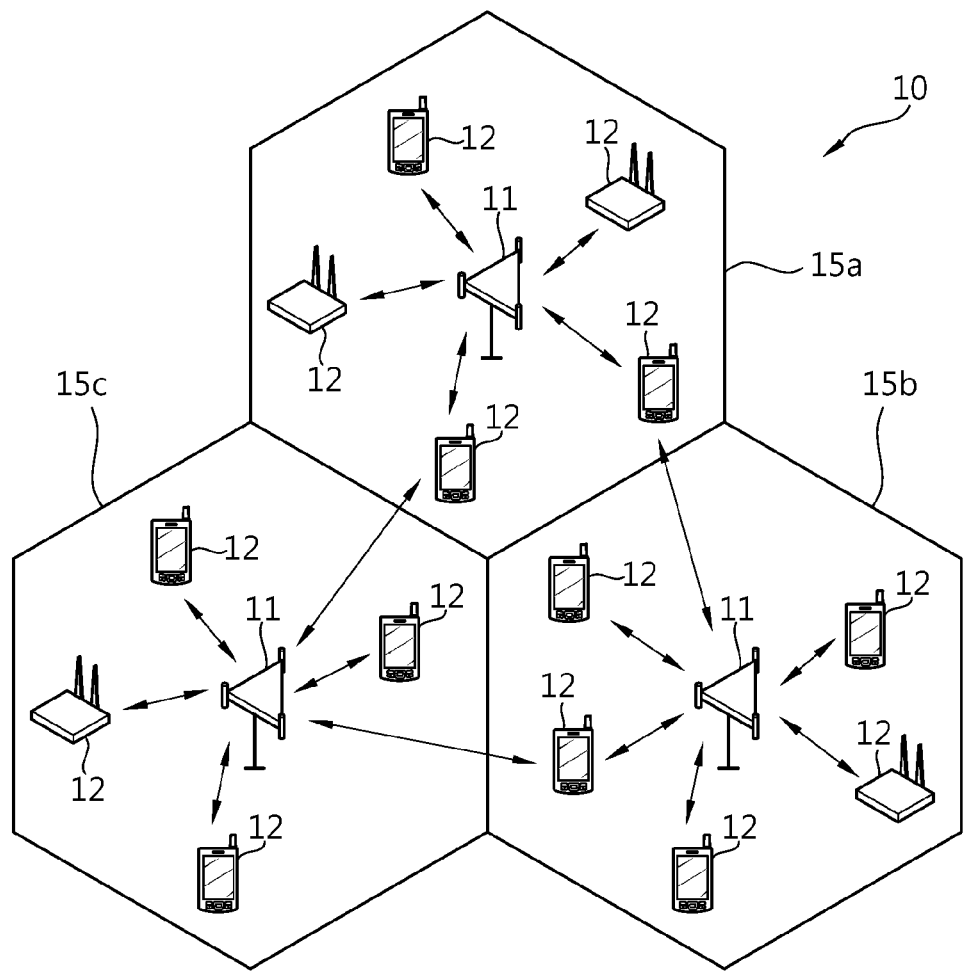
FIG. 1 shows a wireless communication system.

FIG. 1 shows a wireless communication system.

Referring to FIG. 1, the wireless communication system 10 includes one or more Base Stations (BSs) 11. The BSs 11 provide communication services to respective geographical areas (in general called 'cells') 15a, 15b, and 15c. Each of the cells can be divided into a number of areas (called 'sectors'). A User Equipment (UE) 12 can be fixed or mobile and may be referred to as another terminology, such as a Mobile Station (MS), a Mobile Terminal (MT), a User Terminal (UT), a Subscriber Station (SS), a wireless device, a Personal Digital Assistant (PDA), a wireless modem, or a handheld device. In general, the BS 11 refers to a fixed station that communicates with the UEs 12, and it may be referred to as another terminology, such as an evolved-NodeB (eNB), a Base Transceiver System (BTS), or an access point.

The UE belongs to one cell. A cell to which a UE belongs is called a serving cell. A BS providing the serving cell with communication services is called a serving BS. A wireless communication system is a cellular system, and so it includes other cells neighboring a serving cell. Other cells neighboring the serving cell are called neighbor cells. A BS providing the neighbor cells with communication services is called as a neighbor BS. The serving cell and the neighbor cells are relatively determined on the basis of a UE.

This technology can be used in the downlink (DL) or the uplink (UL). In general, DL refers to communication from the BS 11 to the UE 12, and UL refers to communication from the UE 12 to the BS 11. In the DL, a transmitter may be part of the BS 11 and a receiver may be part of the UE 12. In the UL, a transmitter may be part of the UE 12 and a receiver may be part of the BS 11.

Figure 2:
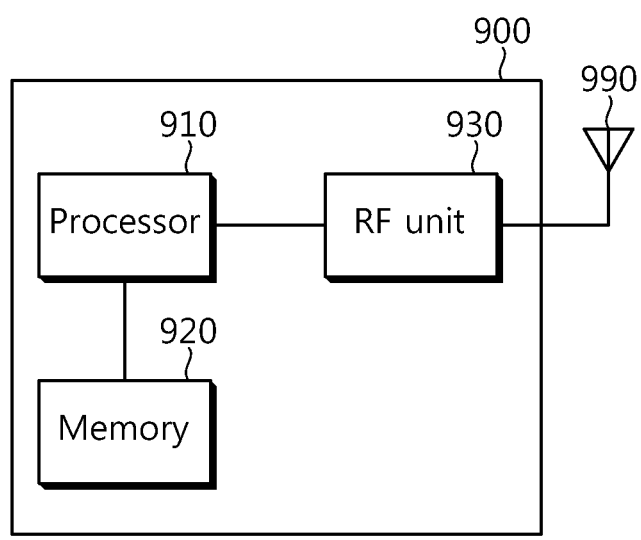
FIG. 2 is a block diagram showing an MS for implementing an embodiment of the present invention.

FIG. 2 is a block diagram showing an MS for implementing an embodiment of the present invention. An MS 900 includes a processor 910, a memory 920, and a radio frequency (RF) unit 930.

The RF unit 930 is coupled to the processor 910. The RF unit 930 receives frequency resource allocation information of a ranging channel from a BS, and transmits the ranging channel. The processor 910 implements proposed functions, processes, and/or methods. An embodiment for implementing the proposed functions or methods by the processor will be described below. The processor 910 allocates the ranging channel to one ranging subband on a resource region determined based on the frequency resource allocation information of the ranging channel. The frequency resource allocation information of the ranging channel may include a cell identifier (ID) of a cell to which the MS belongs and the number of allocated subbands or the number of allocated subband contiguous resource units (CRUs). The memory 920 is coupled to the processor 910, and stores a variety of information for driving the processor 910.

To transmit the ranging channel, the RF unit 930 may include an encoder, a precoder, a subcarrier mapper, and an orthogonal frequency division multiplexing (OFDM) signal generator. The encoder encodes a to-be-transmitted data stream according to a determined coding scheme and thus generates encoded data. Further, the encoder modulates the encoded data into a symbol that represents a position on a constellation. There is no restriction on a modulation scheme. The precoder processes an input symbol according to a MIMO scheme using multiple transmit antennas and thus outputs antenna specific symbols. Further, the precoder distributes the antenna specific symbols to the subcarrier mapper. The subcarrier mapper allocates each antenna specific symbol to a subcarrier, and performs multiplexing according to a user. The OFDM signal generator modulates each antenna specific symbol according to an OFDM scheme, and thus outputs an OFDM symbol.

Figure 3:
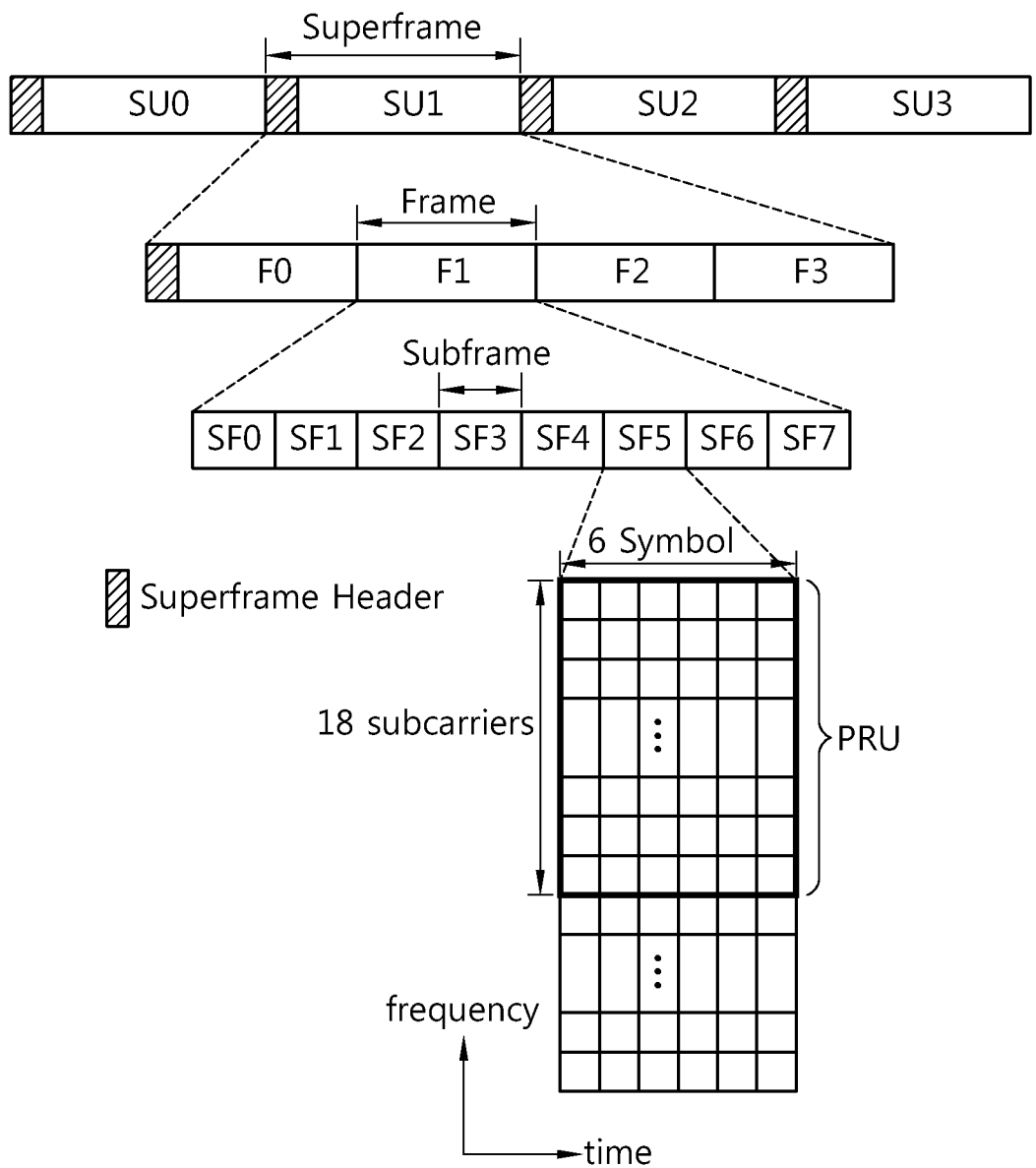
FIG. 3 shows an example of a frame structure.

FIG. 3 shows an example of a frame structure.

Referring to FIG. 3, a superframe (SF) includes a superframe header (SFH) and four frames F0, F1, F2, and F3. Each frame may have the same length in the SF. Although it is shown that each SF has a length of 20 milliseconds (ms) and each frame has a length of 5 ms, the present invention is not limited thereto. A length of the SF, the number of frames included in the SF, the number of SFs included in the frame, or the like can change variously. The number of SFs included in the frame may change variously according to a channel bandwidth and a cyclic prefix (CP) length.

The SFH can carry an essential system parameter and system configuration information. The SFH may be located in a first subframe of the SF. The SFH can be classified into a primary-SFH (P-SFH) and a secondary-SFH (S-SFH). The P-SFH and the S-SFH may be transmitted in every superframe.

One frame includes 8 subframes SF0, SF1, SF2, SF3, SF4, SF5, SF6, and SF7. Each subframe can be used for uplink or downlink transmission. One subframe includes a plurality of orthogonal frequency division multiplexing (OFDM) symbols in a time domain, and includes a plurality of subcarriers in a frequency domain. An OFDM symbol is for representing one symbol period, and can be referred to as other terminologies such as an OFDM symbol, an SC-FDMA symbol, etc., according to a multiple access scheme. The subframe can consist of 5, 6, 7, or 9 OFDM symbols. However, this is for exemplary purposes only, and thus the number of OFDM symbols included in the subframe is not limited thereto. The number of OFDM symbols included in the subframe may change variously according to a channel bandwidth and a CP length. A subframe type may be defined according to the number of OFDM symbols included in the subframe. For example, it can be defined such that a type-1 subframe includes 6 OFDM symbols, a type-2 subframe includes 7 OFDM symbols, a type-3 subframe includes 5 OFDM symbols, and a type-4 subframe includes 9 OFDM symbols. One frame may include subframes each having the same type. Alternatively, one frame may include subframes each having a different type. That is, the number of OFDM symbols included in each subframe may be identical or different in one frame. Alternatively, the number of OFDM symbols included in at least one subframe of one frame may be different from the number of OFDM symbols of the remaining subframes of the frame.

Time division duplexing (TDD) or frequency division duplexing (FDD) may be applied to the frame. In the TDD, each subframe is used in uplink or downlink transmission at the same frequency and at a different time. That is, subframes included in a TDD frame are divided into an uplink subframe and a downlink subframe in the time domain. In the FDD, each subframe is used in uplink or downlink transmission at the same time and at a different frequency. That is, subframes included in an FDD frame are divided into an uplink subframe and a downlink subframe in the frequency domain. Uplink transmission and downlink transmission occupy different frequency bands and can be simultaneously performed.

A subframe includes a plurality of physical resource units (PRUs) in the frequency domain. The PRU is a basic physical unit for resource allocation, and consists of a plurality of consecutive OFDM symbols in the time domain and a plurality of consecutive subcarriers in the frequency domain. The number of OFDM symbols included in the PRU may be equal to the number of OFDM symbols included in one subframe. Therefore, the number of OFDM symbols in the PRU can be determined according to a subframe type. For example, when one subframe consists of 6 OFDM symbols, the PRU may be defined with 18 subcarriers and 6 OFDM symbols.

A logical resource unit (LRU) is a basic logical unit for distributed resource allocation and contiguous resource allocation. The LRU is defined with a plurality of OFDM symbols and a plurality of subcarriers, and includes pilots used in the PRU. Therefore, a desired number of subcarriers for one LRU depend on the number of allocated pilots.

A distributed logical resource unit (DLRU) may be used to obtain a frequency diversity gain. The DLRU includes a distributed subcarrier group in one frequency partition. One subcarrier is a basic unit of constituting the DRU.

A contiguous logical resource unit (CLRU) may be used to obtain a frequency selective scheduling gain. The CLRU includes a localized subcarrier group.

Meanwhile, a fractional frequency reuse (FFR) scheme can be used in a cellular system having multiple cells. The FFR scheme splits a full frequency band into a plurality of frequency partitions (FPs), and allocates a part of the FP to each cell. According to the FFR scheme, different FPs can be allocated between neighbor cells, and the same FP can be allocated between cells separated far from one another. Therefore, inter-cell interference (ICI) can be reduced, and performance of a UE located in a cell edge can be increased.

Figure 4:
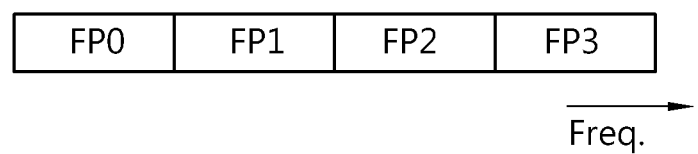
FIG. 4 shows an example of a method of splitting a full frequency band into a plurality of FPs.

FIG. 4 shows an example of a method of splitting a full frequency band into a plurality of FPs.

Referring to FIG. 4, the full frequency band is split into frequency partition #0, frequency partition #1, frequency partition #2, and frequency partition #3. Each FP can be physically or logically split from the full frequency band.

Figure 5:
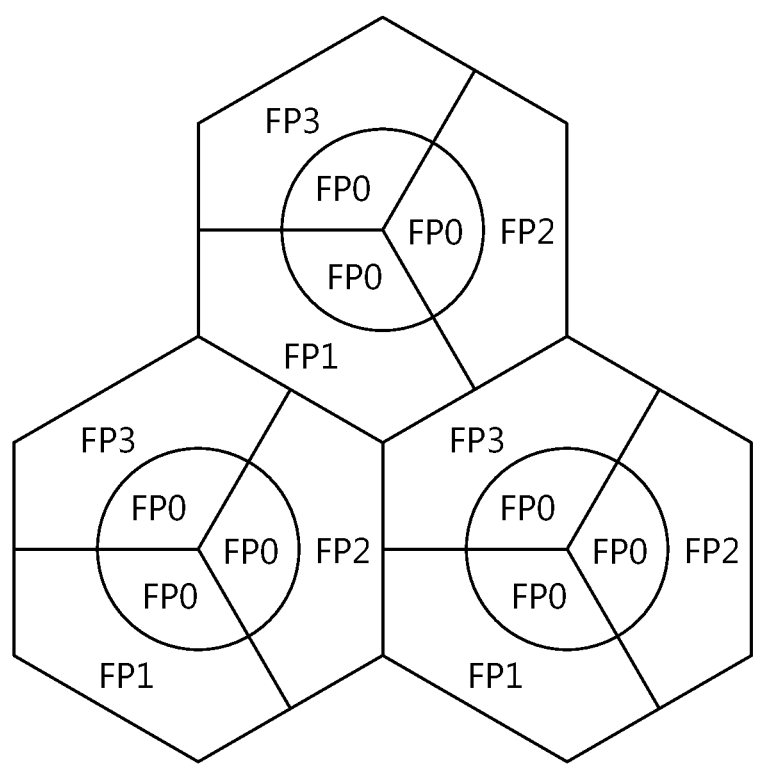
FIG. 5 shows an example of a cellular system using an FFR scheme.

FIG. 5 shows an example of a cellular system using an FFR scheme.

Referring to FIG. 5, each cell is divided into an inner cell and a cell edge. Further, each cell is divided into three sectors. A full frequency band is split into four FPs (i.e., frequency partition #0, frequency partition #1, frequency partition #2, and frequency partition #3).

The frequency partition #0 is allocated in an inner cell. Any one of the frequency partition #1 to the frequency partition #3 is allocated in each sector of a cell edge. In this case, different FPs are allocated between neighbor cells. Hereinafter, an allocated FP is referred to as an active FP, and an unallocated FP is referred to as an inactive FP. For example, when the frequency partition #1 is allocated, the frequency partition #1 is an active FP, and the frequency partition #2 and the frequency partition #3 are inactive FPs.

A frequency reuse factor (FRF) can be defined according to the number of cells (or sectors) into which the full frequency band can be split. In this case, the FRF may be 1 in an inner cell, and may be 3 in each sector of a cell edge.

Figure 6:
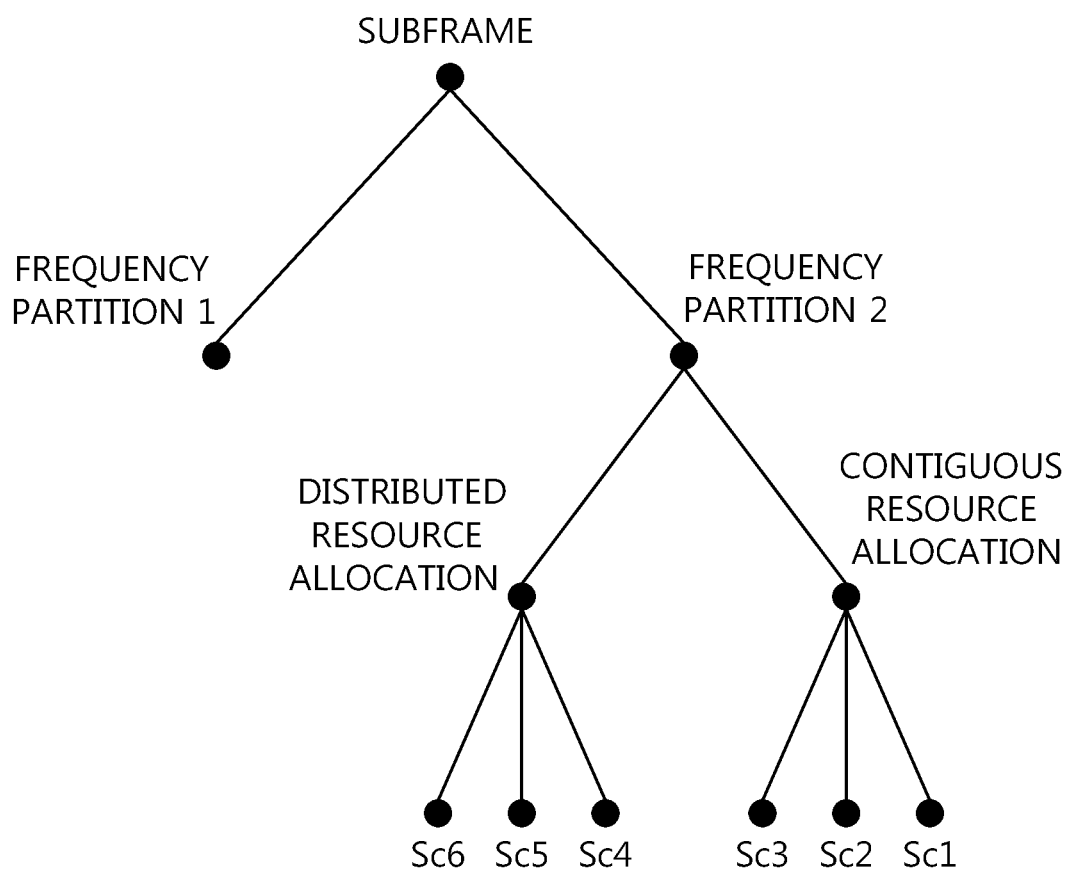
FIG. 6 shows an example of an uplink resource structure.

FIG. 6 shows an example of an uplink resource structure.

Referring to FIG. 6, an uplink subframe can be divided into at least one FP. Herein, the subframe is divided into two FPs (i.e., FP1 and FP2) for example. However, the number of FPs in the subframe is not limited thereto. The number of FPs can be 4 at most. Each FP can be used for other purposes such as FFR.

Each FP consists of at least one PRU. Each FP may include distributed resource allocation and/or contiguous resource allocation. Herein, the second FP (i.e., FP2) includes the distributed resource allocation and the contiguous resource allocation. 'Sc' denotes a subcarrier.

When a plurality of cells exists, an uplink resource may be mapped by performing various processes such as subband partitioning, miniband permutation, frequency partitioning, etc.

First, the subband partitioning process will be described.

Figure 7:
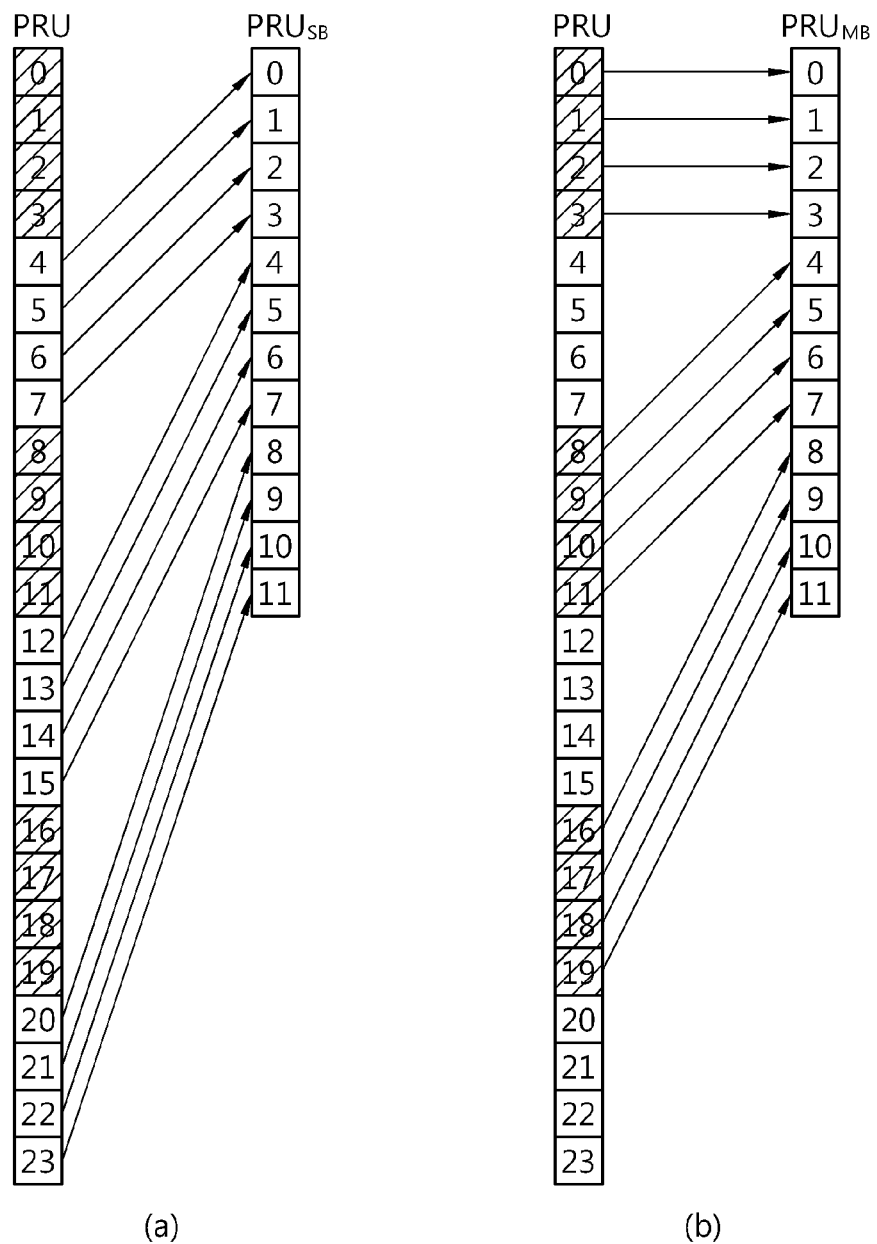
FIG. 7 shows an example of a subband partitioning process.

FIG. 7 shows an example of a subband partitioning process. A bandwidth of 5 MHz is used in the subband partitioning process of FIG. 7.

A plurality of PRUs is divided into a subband (SB) and a miniband (MB). The plurality of PRUs is allocated to the SB in FIG. 7(a), and is allocated to the MB in FIG. 7(b). The SB includes N1 contiguous PRUs, and the MB includes N2 contiguous PRUs. In this case, N1 may be 4 and N2 may be 1. The SB is suitable for frequency selective resource allocation since it provides contiguous allocation of PRUs in a frequency domain. The MB is suitable for frequency diverse resource allocation and may be permutated in the frequency domain.

The number of SBs can be denoted by $K_{SB}$. The number of PRUs allocated to the SBs can be denoted by $L_{SB}$, where $L_{SB}=N1*K_{SB}$. The $K_{SB}$ may vary depending on a bandwidth. The $K_{SB}$ may be determined by an uplink subband allocation count (USAC). A length of the USAC may be 3 bits or 5 bits, and may be broadcast by using an SFH or the like. PRUs remaining after being allocated to the SBs are allocated to MBs. The number of MBs can be denoted by $K_{MB}$. The number of PRUs allocated to the MBs can be denoted by $L_{MB}$, where $L_{MB}=N2*K_{MB}$. The maximum number of SBs that can be formed in a resource region is $N_{sub}=\lfloor N_{PRU}/N1 \rfloor$. The total number of PRUs is $N_{PRU}=L_{SB}+L_{MB}$.

Table 1 shows an example of a relation between the USAC and the $K_{SB}$ when using a bandwidth of 20 MHz. When the bandwidth is 20 MHz, an FFT size may be 2048.

TABLE 1

| USAC | $K_{SB}$ |
|---|---|
| 0 | 0 |
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| 10 | 10 |
| 11 | 11 |
| 12 | 12 |
| 13 | 13 |
| 14 | 14 |
| 15 | 15 |
| 16 | 16 |
| 17 | 17 |
| 18 | 18 |
| 19 | 19 |
| 20 | 20 |
| 21 | 21 |
| 22 | reserved |
| 23 | reserved |
| 24 | reserved |
| 25 | reserved |
| 26 | reserved |
| 27 | reserved |
| 28 | reserved |
| 29 | reserved |
| 30 | reserved |
| 31 | reserved |

Table 2 shows an example of a relation between the USAC and the $K_{SB}$ when using a bandwidth of 10 MHz. When the bandwidth is 10 MHz, the FFT size may be 1024.

TABLE 2

| USAC | $K_{SB}$ |
|---|---|
| 0 | 0 |
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| 10 | 10 |
| 11 | reserved |
| 12 | reserved |
| 13 | reserved |
| 14 | reserved |
| 15 | reserved |

Table 3 shows an example of a relation between the USAC and the $K_{SB}$ when using a bandwidth of 5 MHz. When the bandwidth is 5 MHz, the FFT size may be 512.

TABLE 3

| USAC | $K_{SB}$ |
|---|---|
| 0 | 0 |
| 1 | 1 |
| 2 | 2 |
| 3 | 3 |
| 4 | 4 |
| 5 | reserved |
| 6 | reserved |
| 7 | reserved |

A plurality of PRUs is divided into a subband (SB) and a miniband (MB), and is reordered in an SB PRU ($PRU_{SB}$) and an MB PRU ($PRU_{MB}$). PRUs in the $PRU_{SB}$ are respectively indexed from 0 to ($L_{SB}$−1). PRUs in the $PRU_{MB}$ are respectively indexed from 0 to ($L_{MB}$−1).

Figure 8:
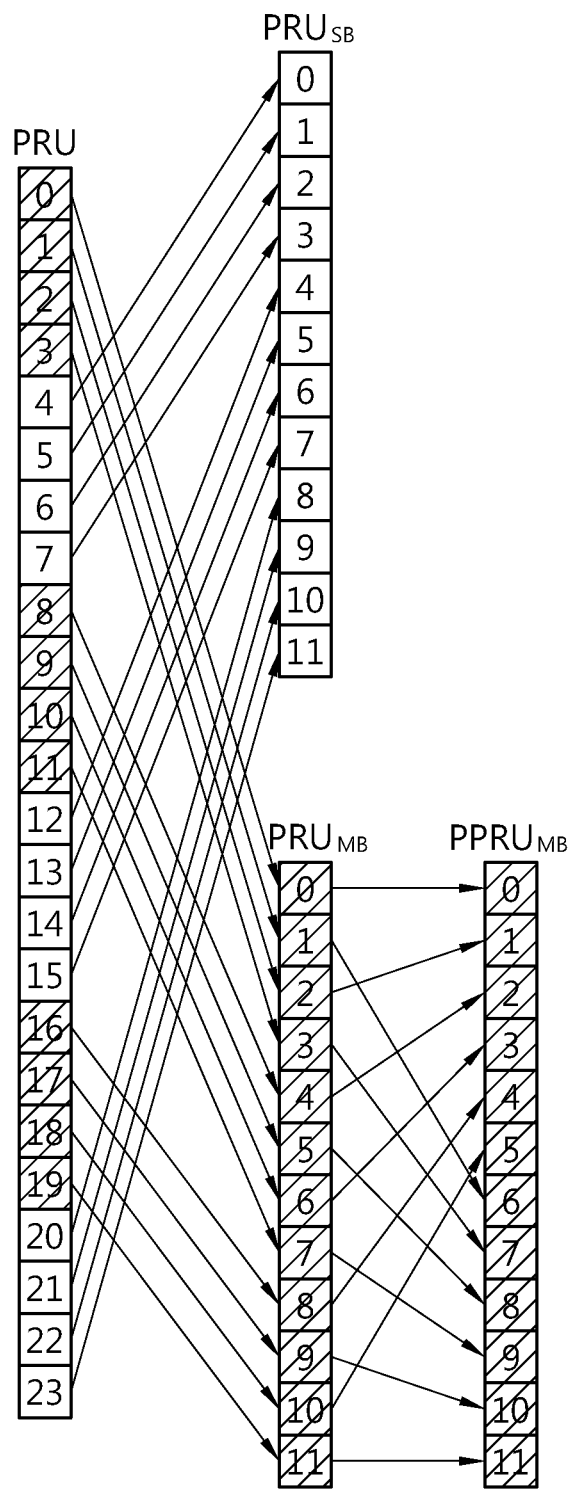
FIG. 8 shows an example of a miniband permutation process.

FIG. 8 shows an example of a miniband permutation process. In the miniband permutation process, a $PRU_{MB}$ is mapped to a permutation PRU ($PPRU_{MB}$). This is to ensure frequency diversity in each frequency partition. The process of FIG. 8 can be performed subsequent to the subband partitioning process of FIG. 7 when using a bandwidth of 5 MHz. PRUs in the $PRU_{MB}$ are permutated and mapped to the $PPRU_{MB}$.

Figure 9:
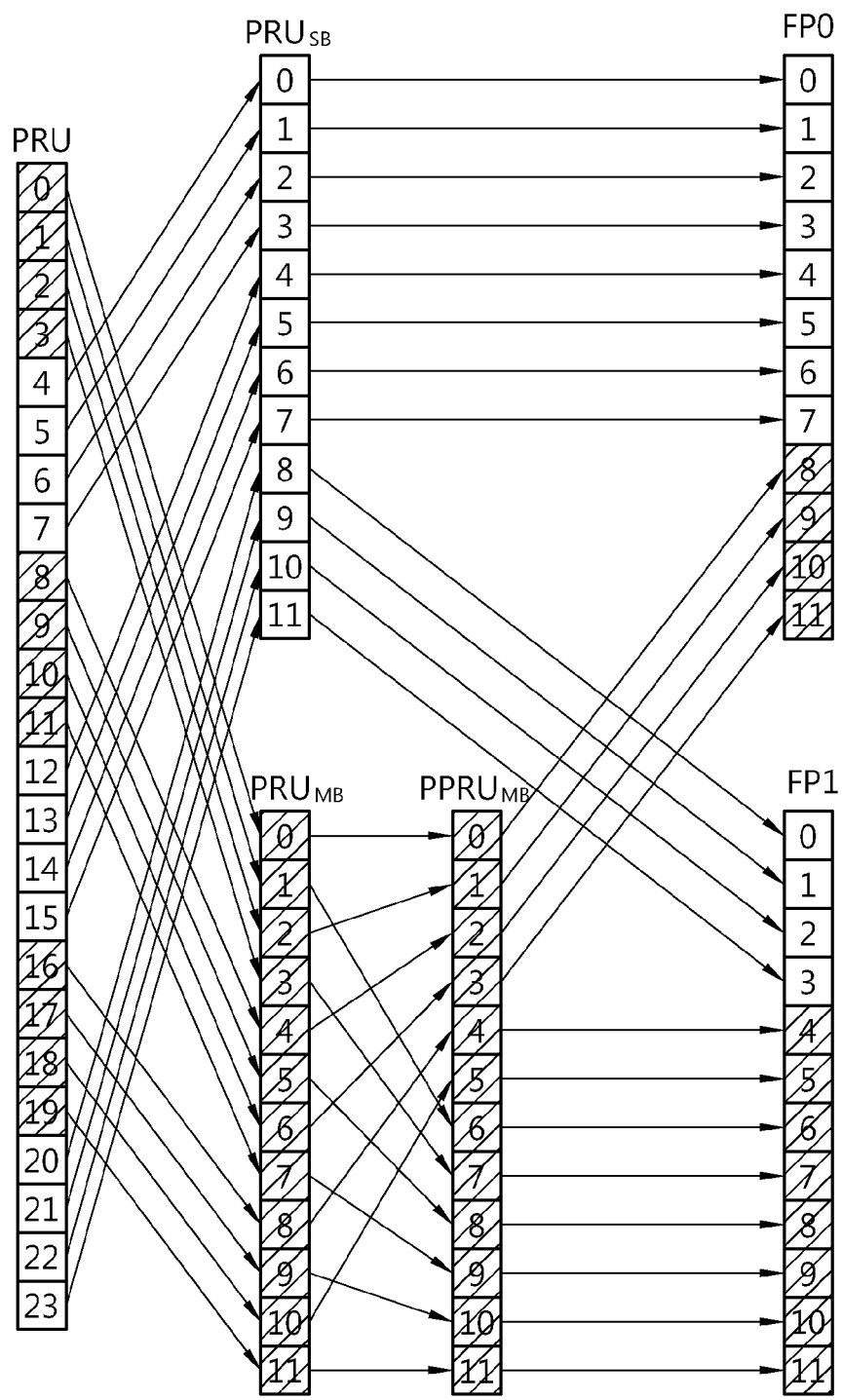
FIG. 9 shows an example of a frequency partitioning process.

FIG. 9 shows an example of a frequency partitioning process. The process of FIG. 9 can be performed subsequent to the subband partitioning process of FIG. 7 and the miniband permutation process of FIG. 8 when using a bandwidth of 5 MHz.

PRUs of a $PRU_{SB}$ and a $PPRU_{MB}$ are allocated to at least one frequency partition. The maximum number of frequency partitions may be 4. Frequency partition configuration information may be determined by uplink frequency partition configuration (UFPC). The UFPC may have a different configuration according to a bandwidth, and may be broadcast by using an S-SFH or the like. The UFPC may indicate a size of a frequency partition, the number of frequency partitions, etc. A frequency partition count (FPCT) indicates the number of frequency partitions. FPSi indicates the number of PRUs allocated to a frequency partition #i. Further, an uplink frequency partition subband count (UFPSC) defines the number of subbands allocated to an FPi(i>0). The UFPSC may have a length of 1 to 3 bits.

Table 4 shows an example of a relation between the UFPC and the frequency partition when using a bandwidth of 20 MHz. When the bandwidth is 20 MHz, the FFT size may be 2048.

TABLE 4

| UFPC | FP0:FP1:FP2:FP3 | FPCT | FPS0 | FPSi (i > 0) |
|---|---|---|---|---|
| 0 | 1:0:0:0 | 1 | $N_{PRU}$ | 0 |
| 1 | 0:1:1:1 | 3 | 0 | $FPS1 = N_{PRU} - 2 * \text{floor}(N_{PRU}/3)$<br>$FPS2 = \text{floor}(N_{PRU}/3)$<br>$FPS3 = \text{floor}(N_{PRU}/3)$ |
| 2 | 1:1:1:1 | 4 | $N_{PRU} - 3 * \text{floor}(N_{PRU}/4)$ | $\text{Floor}(N_{PRU}/4)$ |
| 3 | 3:1:1:1 | 4 | $N_{PRU} - 3 * \text{floor}(N_{PRU}/6)$ | $\text{Floor}(N_{PRU}/6)$ |
| 4 | 5:1:1:1 | 4 | $N_{PRU} - 3 * \text{floor}(N_{PRU}/8)$ | $\text{Floor}(N_{PRU}/8)$ |
| 5 | 9:1:1:1 | 4 | $N_{PRU} - 3 * \text{floor}(N_{PRU}/12)$ | $\text{Floor}(N_{PRU}/12)$ |
| 6 | 9:5:5:5 | 4 | $N_{PRU} - 3 * \text{floor}(N_{PRU} * 5/24)$ | $\text{Floor}(N_{PRU} * 5/24)$ |
| 7 | 0:1:1:0 | 2 | 0 | $N_{PRU}/2$ for i = 1, 2<br>0 for i = 3 |
| 8 | 1:1:1:0 | 3 | $N_{PRU} - 2 * \text{floor}(N_{PRU}/3)$ | $\text{floor}(N_{PRU}/3)$ for i = 1, 2<br>0 for i = 3 |
| 9~15 | Reserved | | | |

Table 5 shows an example of a relation between the UFPC and the frequency partition when using a bandwidth of 10 MHz. When the bandwidth is 10 MHz, the FFT size may be 1024.

TABLE 5

| UFPC | FP0:FP1:FP2:FP3 | FPCT | FPS0 | FPSi (i > 0) |
|---|---|---|---|---|
| 0 | 1:0:0:0 | 1 | $N_{PRU}$ | 0 |
| 1 | 0:1:1:1 | 3 | 0 | $FPS1 = N_{PRU} - 2 * \text{floor}(N_{PRU}/3)$<br>$FPS2 = \text{floor}(N_{PRU}/3)$<br>$FPS3 = \text{floor}(N_{PRU}/3)$ |
| 2 | 1:1:1:1 | 4 | $N_{PRU} - 3 * \text{floor}(N_{PRU}/4)$ | $\text{Floor}(N_{PRU}/4)$ |
| 3 | 3:1:1:1 | 4 | $N_{PRU} - 3 * \text{floor}(N_{PRU}/6)$ | $\text{Floor}(N_{PRU}/6)$ |
| 4 | 5:1:1:1 | 4 | $N_{PRU} - 3 * \text{floor}(N_{PRU}/8)$ | $\text{Floor}(N_{PRU}/8)$ |
| 5 | 9:5:5:5 | 4 | $N_{PRU} - 3 * \text{floor}(N_{PRU} * 5/24)$ | $\text{Floor}(N_{PRU} * 5/24)$ |
| 6 | 0:1:1:0 | 2 | 0 | $N_{PRU}/2$ for i = 1, 2<br>0 for i = 3 |
| 7 | 1:1:1:0 | 3 | $N_{PRU} - 2 * \text{floor}(N_{PRU}/3)$ | $\text{floor}(N_{PRU}/3)$ for i = 1, 2<br>0 for i = 3 |

Table 6 shows an example of a relation between the UFPC and the frequency partition when using a bandwidth of 5 MHz. When the bandwidth is 5 MHz, the FFT size may be 512.

TABLE 6

| UFPC | FP0:FP1:FP2:FP3 | FPCT | FPS0 | FPSi (i > 0) |
|---|---|---|---|---|
| 0 | 1:0:0:0 | 1 | $N_{PRU}$ | 0 |
| 1 | 0:1:1:1 | 3 | 0 | $FPS1 = N_{PRU} - 2 * \text{floor}(N_{PRU}/3)$<br>$FPS2 = \text{floor}(N_{PRU}/3)$<br>$FPS3 = \text{floor}(N_{PRU}/3)$ |
| 2 | 1:1:1:1 | 4 | $N_{PRU} - 3 * \text{floor}(N_{PRU}/4)$ | $\text{Floor}(N_{PRU}/4)$ |
| 3 | 3:1:1:1 | 4 | $N_{PRU} - 3 * \text{floor}(N_{PRU}/6)$ | $\text{Floor}(N_{PRU}/6)$ |
| 4 | 9:5:5:5 | 4 | $N_{PRU} - 3 * \text{floor}(N_{PRU} * 5/24)$ | $\text{Floor}(N_{PRU} * 5/24)$ |
| 5 | 0:1:1:0 | 2 | 0 | $N_{PRU}/2$ for i = 1, 2<br>0 for i = 3 |
| 6 | 1:1:1:0 | 3 | $N_{PRU} - 2 * \text{floor}(N_{PRU}/3)$ | $\text{floor}(N_{PRU}/3)$ for i = 1, 2<br>0 for i = 3 |
| 7 | reserved | | | |

If $K_{SB,FPi}$ denotes the number of SBs in the FPi and $K_{MB,FPi}$ denotes the number of MBs in the FPi, these values can be determined by Equation 1.

$$K_{SB,FPi} = \begin{cases} K_{SB} - (FPCT-1) \cdot UFPSC, & i=0 \\ UFPSC, & i>0 \end{cases} \quad \text{[Equation 1]}$$

$$K_{MB,FPi} = \begin{cases} K_{MB} - (FPCT-1) \cdot (FPS - UFPSC \cdot N1/N2), & i=0 \\ FPS - UFPSC \cdot N1/N2, & i>0 \end{cases}$$

In each frequency partition, the number of SB PRUs is $L_{SB,FPi} = N1*K_{SB,FPi}$, and the number of MB PRUs is $L_{MB,FPi} = N2*K_{MB,FPi}$.

The PRUs in the $PRU_{SB}$ and the $PPRU_{MB}$ can be mapped to each frequency partition according to Equation 2.

$$PRU_{FPi}(j) = \begin{cases} PRU_{SB}(k_1), & 0 \leq j < L_{SB,FPi} \\ PPRU_{MB}(k_2), & L_{SB,FPi} \leq j < (L_{SB,FPi} + L_{MB,FPi}) \end{cases} \quad \text{[Equation 2]}$$

Herein, $$k_1 = \sum_{m=0}^{i-1} L_{SB,FPm} + j, \text{ and } k_2 = \sum_{m=0}^{i-1} L_{SB,FPm} + j - L_{SB,FPi}.$$

PRUs of a $PRU_{FPi}$ can be mapped to an LRU. Hereinafter, there is a restriction that mapping and permutation are performed within a frequency partition.

Each frequency partition can be divided into a CRU and a DRU, and can be performed on a sector basis. A size of an SB-based CRU is denoted by $UCAS_{SB,i}$, where i is the number of SB-based CRUs of an FPi in a unit of subband size, and this value may be broadcast. $UCAS_{MB}$ denotes the number of MB-based CRUs of frequency partition #0, and this value may also be broadcast. The number of CRUs of each frequency partition can be denoted by $L_{CRU,FPi}$, and can be expressed by Equation 3.

$$L_{CRU,FPi} = \begin{cases} UCAS_{SB,i} \cdot N1 + UCAS_{MB}, & i>0 \\ UCAS_{SB,i} \cdot N1, & 0 < i < FPCT \end{cases} \quad \text{[Equation 3]}$$

The number of DRUs of each frequency partition can be denoted by $L_{DRU,FPi}$, and can be expressed by Equation 4.

$$L_{DRU,FPi} = FPSi \times N2 - L_{CRU,FPi} \quad \text{[Equation 4]}$$

PRUs in a $PRU_{FPi}$ can be mapped to a $CRU_{FPi}$ by Equation 5.

$$CRU_{FPi}[j] = \quad \text{[Equation 5]}$$
$$\begin{cases} PRU_{FPi}[j], & 0 \leq j \leq UCAS_{SB,i} \cdot N1 \\ PRU_{FPi}[k + UCAS_{SB,i} \cdot N1], & UCAS_{SB,i} \cdot N1 \leq j < L_{CRU,FPi} \end{cases}$$

In Equation 5, $k = s[j - UCAS_{SB,i}*N1]$. $s[\ ]$ is a CRU/DRU allocation sequence, where $0 \leq s[j] < FPSi*N2 - UCAS_{SB,i}*N1$.

The PRUs in the $PRU_{FPi}$ can be mapped to a $DRU_{FPi}$ by Equation 6.

$$DRU_{FPi}[j] = PRU_{FPi}[k + UCAS_{SB,i} \cdot N1], \; 0 \leq L_{DRU,FPi} \quad \text{[Equation 6]}$$

Herein, $k = s^c[j]$, where $s^c[\ ]$ denotes a sequence obtained by reordering remaining PRUs not allocated to the CRU.

In addition, tile permutation may be performed. Each DRU of a frequency partition can be divided into 3 tiles including 6 contiguous subcarriers. A plurality of tiles in the frequency partition is permutated to obtain a frequency diversity gain. Allocation of a physical tile of the DRU onto a logical tile of a subchannel can be defined by Equation 7.

$$\text{Tile}(s,n,t) = L_{DRU,FPi} \cdot n + g(\text{PermSeq}(\ ), s, n, t) \quad \text{[Equation 7]}$$

In Equation 7, Tile(s,n,t) denotes a tile index of an $n^{th}$ the in an $s^{th}$ DLRU of a $t^{th}$ subframe. n may be any one value ranging from 0 to 2. t is a subframe index. s is a DLRU index having any one value ranging from 0 to $L_{DRU,FPi} - 1$. PermSeq( ) is a permutation sequence with a length of $L_{DRU,FPi}$, and may be determined by SEED = {IDcell*1367} mod $2^{10}$. The permutation sequence may be generated by any sequence generation algorithm.

(PermSeq( ),s,n,t) is equal to {PermSeq[n+107*s+t] $\text{mod}_{DRU,FPi}$}+UL_PermBase} mod $L_{DRU,FPi}$.

Among uplink control channels, there is a case where specific control channel has to be allocated to one or more contiguous PRUs in a frequency domain. For example, a ranging channel may be allocated to one or two subbands in the frequency domain. In addition, in case of the specific channel, when adjacent sectors use the same time and frequency resources, performance deterioration caused by interference may be decreased or increased according to a channel design rule. Therefore, when a plurality of frequency partitions exists and a subband and a miniband coexist in a resource region, a resource allocation method for the specific control channel such as the ranging channel is required. That is, a method of allocating a control channel while preventing adjacent sectors from having the same or overlapping time or frequency domain may be provided.

Hereinafter, the proposed ranging channel transmission method will be described according to an embodiment of the present invention. Although a ranging channel for initial access and handover of an MS will be described as an example in the present embodiment, this is for exemplary purposes only. Thus, the present invention can also apply to various types of control channels. In addition, although it is assumed in the present invention that a plurality of frequency partitions exist, the present invention can also apply to a case where the number of frequency partitions is 1.

Figure 10:
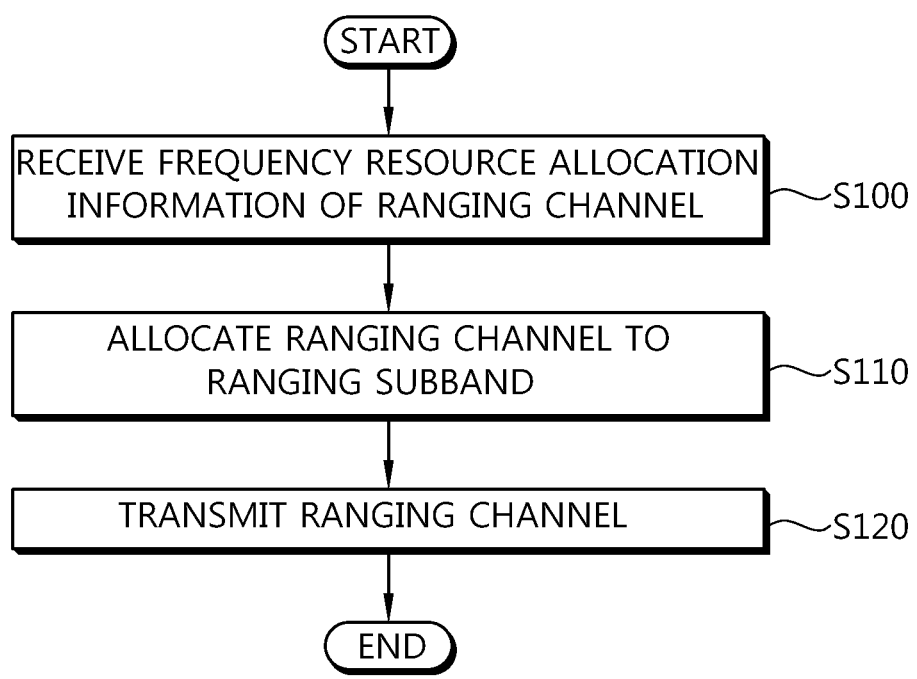
FIG. 10 shows an example of the proposed ranging channel transmission method.

FIG. 10 shows an example of the proposed ranging channel transmission method.

In step S100, an MS receives frequency resource allocation information of a ranging channel. In step S110, the MS allocates the ranging channel to one ranging subband on a resource region determined based on the frequency resource allocation information of the ranging channel.

As a resource for the ranging channel, N contiguous subbands may be allocated (where N≥1). For convenience of explanation, it is assumed hereinafter that $N_{sub}$ subbands exist. If the total number of PRUs is $N_{PRU}$, $N_{sub}$ may be equal to $N_{PRU}/N1$. For example, in case of using a bandwidth of 10 MHz, $N_{PRU}$ may be 48, and $N_{sub}$ may be 12.

The resource for the ranging channel may be reserved for the ranging channel in a resource mapping process. A BS may transmit to the MS an index of a physical subband to which the ranging channel is allocated. The index of the physical subband implies indexing of $N_{sub}$ subbands existing before subband partitioning in the resource mapping process. The subband index may be broadcast. An index of a predetermined number of subbands or an index of a logical subband based on a predetermined specific rule may be broadcast.

Alternatively, a resource may be allocated according to a pre-defined equation based on a cell ID, a superframe number, a frame number, a subframe number, etc.

The MS may preferentially allocate N contiguous subbands for the ranging channel in a subframe for transmitting the ranging channel, and then may perform resource mapping on the remaining $N_{sub}-N$ subbands. That is, if the total number of PRUs is $N_{PRU}$, resource mapping can be performed on $N_{PRU}-N*N1$ PRUs by excluding $N*N1$ PRUs allocated to the ranging channel. In this case, if the subband to which the ranging channel is allocated is set in a cell-specific manner by the BS, the use of an FFR scheme or the like may be restricted since $N_{sub}-N$ subbands exist in different positions in a resource region for each cell.

Alternatively, the subband for the ranging channel may be directly allocated to the ranging channel without having to reserve the subband. Since indices of a logical subband and a physical subband allocated for the ranging channel can be known when resource mapping is performed, resource mapping can be performed based on the indices except for ranging channel resources.

Figure 11:
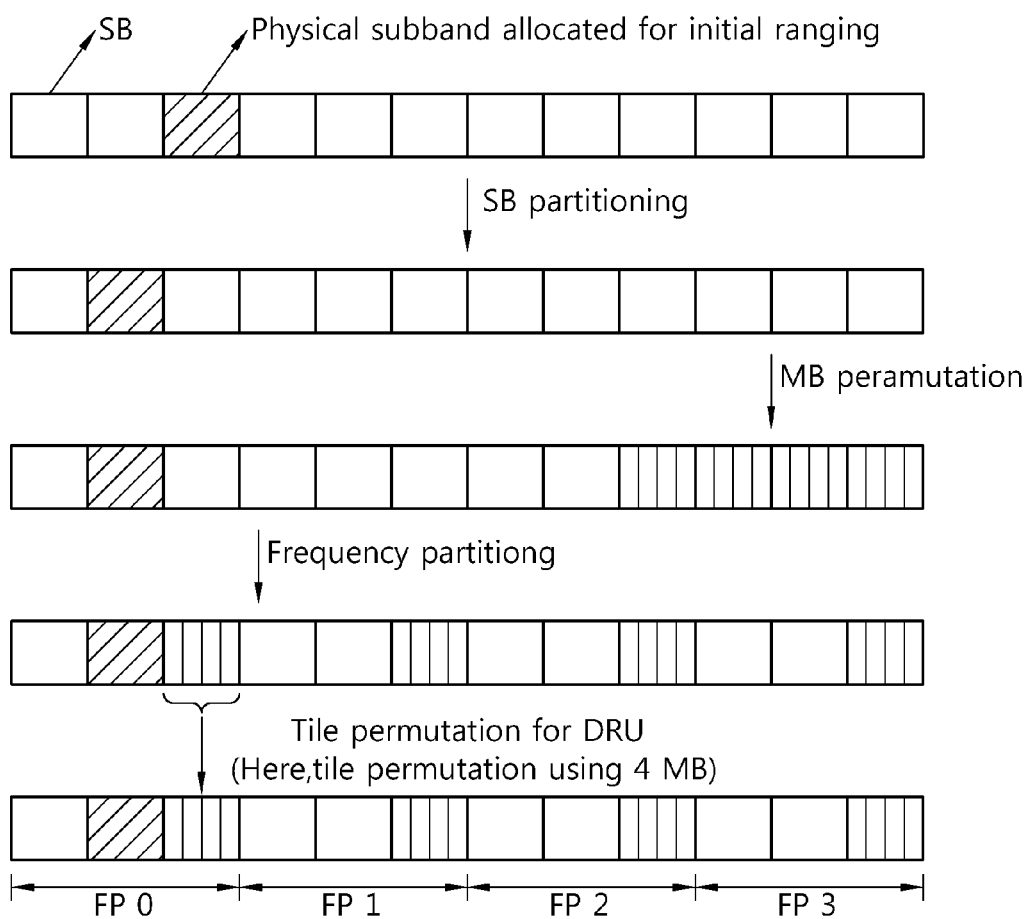
FIG. 11 shows a case where a physical subband allocated for a ranging channel is allocated to an SB CRU.

FIG. 11 shows a case where a physical subband allocated for a ranging channel is allocated to an SB CRU. That is, each cell allocates the ranging channel to an SB CRU of each cell. In this case, a ranging channel resource may be mapped to a logical channel without any change in a resource mapping process, or may be mapped to a logical region allocated for the SB CRU. The ranging channel resource does not have an effect on permutation between remaining resources when resource mapping is performed. The remaining resources except for the ranging channel resource may be re-indexed in the logical region, or may have the same index as a subband without the ranging channel.

In the allocation of the ranging channel to the SB CRU of each cell, the ranging channel resource may be allocated by raging channel configuration information. The ranging channel configuration information may include information on a time domain and information on a frequency domain in a resource region to which the ranging channel is allocated.

Table 7 shows an example of time resource allocation configuration information for the ranging channel. The time resource allocation configuration information may be broadcast.

TABLE 7

| configuration | Ranging-period P_R | N_RCH(number of ranging channels per SF) |
|---|---|---|
| 0 | ¼ (5 ms) | 4 |
| 1 | ½ (10 ms) | 2 |
| 2 | 1 (20 ms) | 1 |
| 3 | 2 (40 ms) | ½ |
| 4 | 3 (60 ms) | ⅓ |

The time resource allocation information of the ranging channel may be determined by a cell ID and N_RCH. The time resource allocation information may be any one of a subframe index, frame index, and superframe index of a resource to which the ranging channel is allocated.

Equation 8 shows an example of an equation for determining a subframe index of a resource to which the ranging channel is allocated.

$$I_{SF}=\mathrm{mod}(f(\mathrm{CellID}), n_{SF} \cdot n_F/N\_RCH) \quad \text{[Equation 8]}$$

$I_{SF}(0, \ldots, n_{SF}*n_F/N\_RCH-1)$ denotes a subframe index of a resource to which the ranging channel is allocated among $n_{SF}*n_F/N\_RCH-1$ subframes during a 1/N_RCH superframe period. $n_{SF}$ denotes the number of subframes in one frame, and $n_F$ denotes the number of frames in one superframe. f(CellID) denotes a function of a cell ID. The cell ID can be replaced with other parameters such as a BS ID, etc. According to Equation 8 above, an $I_{SF}^{th}$ subframe is periodically allocated to the ranging channel during a 1/N_RCH superframe period. For example, if $n_{SF}=8$, $n_F=4$, and N_RCH=⅓, one superframe includes 32 subframes, and 3-superframes include 96 subframes. Among the 96 subframes, the $I_{SF}^{th}$ subframe may be periodically allocated to the ranging channel per every 3 superframes.

Equation 9 shows another example of an equation for determining a subframe index of a resource to which the ranging channel is allocated.

$$I_{SF}=\mathrm{mod}(f(\mathrm{CellID}), n_{SF}) \quad \text{[Equation 9]}$$

$I_{SF}(0, \ldots, n_{SF}-1)$ denotes a subframe index of a resource to which the ranging channel is allocated among $n_{SF}-1$ subframes during a 1/N_RCH superframe period. A position of a frame to which the ranging is allocated may be predetermined or may be broadcast. According to Equation 9 above, an $I_{SF}^{th}$ subframe in one frame is periodically allocated to the ranging channel during the 1/N_RCH superframe period.

Equation 10 shows an example of an equation for determining a frame index of a resource to which the ranging channel is allocated.

$$I_F=\mathrm{mod}(f(\mathrm{CellID}), n_F/N\_RCH) \quad \text{[Equation 10]}$$

$I_F(0, \ldots, n_F/N\_RCH-1)$ denotes a frame index of a resource to which the ranging channel is allocated among $n_F/N\_RCH-1$ frames during a 1/N_RCH superframe period. A position of a subframe to which the ranging is allocated in an $I_F^{th}$ frame may be predetermined or may be broadcast. According to Equation 10 above, one subframe in the $I_F^{th}$ frame is periodically allocated to the ranging channel during the 1/N_RCH superframe period.

Equation 11 shows an example of an equation for determining a superframe index of a resource to which the ranging channel is allocated.

$$I_{SuperF}=\mathrm{mod}(f(\mathrm{CellID}), 1/N\_RCH), N\_RCH \leq 1 \quad \text{[Equation 11]}$$

$I_{SuperF}(0, \ldots, /N\_RCH-1)$ denotes a superframe index of a resource to which the ranging channel is allocated among 1/N_RCH-1 superframes during a 1/N_RCH superframe period. Positions of a frame and a subframe to which the ranging is allocated in an $I_{SuperF}^{th}$ frame may be predetermined or may be broadcast. According to Equation 11 above, one subframe in one frame existing in the $I_{superF}^{th}$ superframe is periodically allocated to the ranging channel during the 1/N_RCH superframe period.

Frequency resource allocation information of the ranging channel may be determined by a cell ID, the number $K_{SB}$ of allocated subbands, or the number $Y_{SB}$ of allocated SB CRUs. The frequency resource allocation information may be a subband index of a resource to which the ranging channel is allocated. The $K_{SB}$ or $Y_{SB}$ may be broadcast, or may be indicated by another signal.

Equation 12 shows an example of an equation for determining a subband index of a resource to which the ranging channel is allocated.

$$I_{SB}=\mathrm{mod}(\mathrm{CellID}, K_{SB}) \quad \text{[Equation 12]}$$

$I_{SB}(0, \ldots, K_{SB}-1)$ denotes an index of a subband to which a resource for the ranging channel is allocated among $K_{SB}$ subbands.

Equation 13 shows an example of an equation for determining an index of a resource to which the ranging channel is allocated.

$$I_{idx}=\mod(f(\text{CellID}), n_{SF} \cdot n_F/N\_RCH \cdot K_{SB})$$ [Equation 13]

$I_{idx}(0, \ldots, n_{SF}*n_F/N\_RCH*K_{SB}-1)$ denotes an index of a resource to which the ranging channel is allocated among $n_F/N\_RCH-1$ subframes and $K_{SB}$ subbands during a $1/N\_RCH$ superframe period.

Equation 14 shows another example of an equation for determining an index of a resource to which the ranging channel is allocated.

$$I_{idx}=\mod(f(\text{CellID}), n_{SB} \cdot K_{SB})$$ [Equation 14]

$I_{idx}(0, \ldots, n_{SF}*K_{SB}-1)$ denotes an index of a resource to which the ranging channel is allocated among $n_{SF}$ subframes and $K_{SB}$ subbands during a $1/N\_RCH$ superframe period.

When the index of the resource to which the ranging channel is allocated is determined by Equation 13 or Equation 14 above, a subband index and a subframe index to which the ranging channel is allocated may be determined by Equation 15.

$$I_{SF}=\lfloor I_{idx}/K_{SB} \rfloor$$

$$I_{SB}=\mod(I_{idx}, K_{SB})$$ [Equation 15]

A position of a frame to which the ranging is allocated may be predetermined or may be broadcast.

Equation 16 shows another example of an equation for determining a subband index of a resource to which the ranging channel is allocated.

$$I_{idx}=\mod(f(\text{CellID}), n_F/N\_RCH \cdot K_{SB})$$ [Equation 16]

$I_{idx}(0, \ldots, n_F/N\_RCH*K_{SB}-1)$ denotes an index of a resource to which the ranging channel is allocated among $n_F/N\_RCH-1$ frames and $K_{SB}$ subbands during a $1/N\_RCH$ superframe period.

When the index of the resource to which the ranging channel is allocated is determined by Equation 16 above, a subband index and a frame index to which the ranging channel is allocated may be determined by Equation 17.

$$I_F=\lfloor I_{idx}/K_{SB} \rfloor$$

$$I_{SB}=\mod(I_{idx}, K_{SB})$$ [Equation 17]

A position of a subframe to which the ranging is allocated in an $I_F^{th}$ frame may be predetermined or may be broadcast.

Equation 18 shows another example of an equation for determining a subband index of a resource to which the ranging channel is allocated.

$$I_{idx}=\mod(f(\text{CellID}), K_{SB}/N\_RCH)$$ [Equation 18]

$I_{idx}(0, \ldots, K_{SB}/N\_RCH-1)$ denotes an index of a resource to which the ranging channel is allocated among $1/N\_RCH-1$ superframes and $K_{SB}$ subbands during a $1/N\_RCH-1$ superframe period.

When the index of the resource to which the ranging channel is allocated is determined by Equation 18 above, a subband index and a superframe index to which the ranging channel is allocated may be determined by Equation 19.

$$I_{SuperF}=\lfloor I_{idx}/K_{SB} \rfloor$$

$$I_{SB}=\mod(I_{idx}, K_{SB})$$ [Equation 19]

Positions of a subframe and a frame to which the ranging is allocated in an $I_{SuperF}^{th}$ superframe may be predetermined or may be broadcast.

By setting N_RCH=1 in the various equations for determining an index of a frequency resource or a time resource to which the ranging channel is allocated, a position of a superframe to which the ranging channel is allocated can be predetermined. In addition, by setting $n_F=1$, a position of a frame to which the ranging channel is allocated can be predetermined. In addition, by setting $n_{SF}=1$, a position of a subframe to which the ranging channel is allocated can be predetermined. The aforementioned various equations can be combined in various forms. Further, if the ranging channel is allocated limitedly to the SB CRU as described above, permutation may not be affected in this case. Therefore, the number $K_{SB}$ of allocated subbands can be replaced with the number $Y_{SB}$ of SB CRUs for all the equations above.

Referring back to FIG. 10, in step S120, the MS transmits the ranging channel to the BS.

The MS of FIG. 2 for implementing the embodiment of the present invention can be explained by using the embodiment of FIG. 10.

As described above, the RF unit 930 is coupled to the processor 910. The RF unit 930 receives the frequency resource allocation information of the ranging channel from the BS, and transmits the ranging channel. The processor 910 allocates the ranging channel to one ranging subband on the resource region determined based on the frequency resource allocation information of the ranging channel. The frequency resource allocation information of the ranging channel may include the cell ID of the cell to which the MS belongs and the number of allocated subbands or the number of allocated subband contiguous resource units (CRUs). The number of allocated subbands or the number of allocated SB CRUs is broadcast or indicated by another signal. The number of allocated subbands varies depending on a system bandwidth.

The ranging subband is a subband having an index determined by an equation $I_{SB}=\mod(\text{cellID}, X_{SB})$. Herein, $I_{SB}$ denotes subband indices $0, \ldots, X_{SB}-1$ on a resource region, cellID denotes a cell ID of a cell to which the MS belongs, and $X_{SB}$ denotes the number of allocated subbands or the number of allocated SB CRUs. $\mod(\text{cellID}, X_{SB})$ is a remainder obtained by dividing the cell ID by $X_{SB}$. The cellID may be any one integer ranging from 0 to 767.

Figure 12:
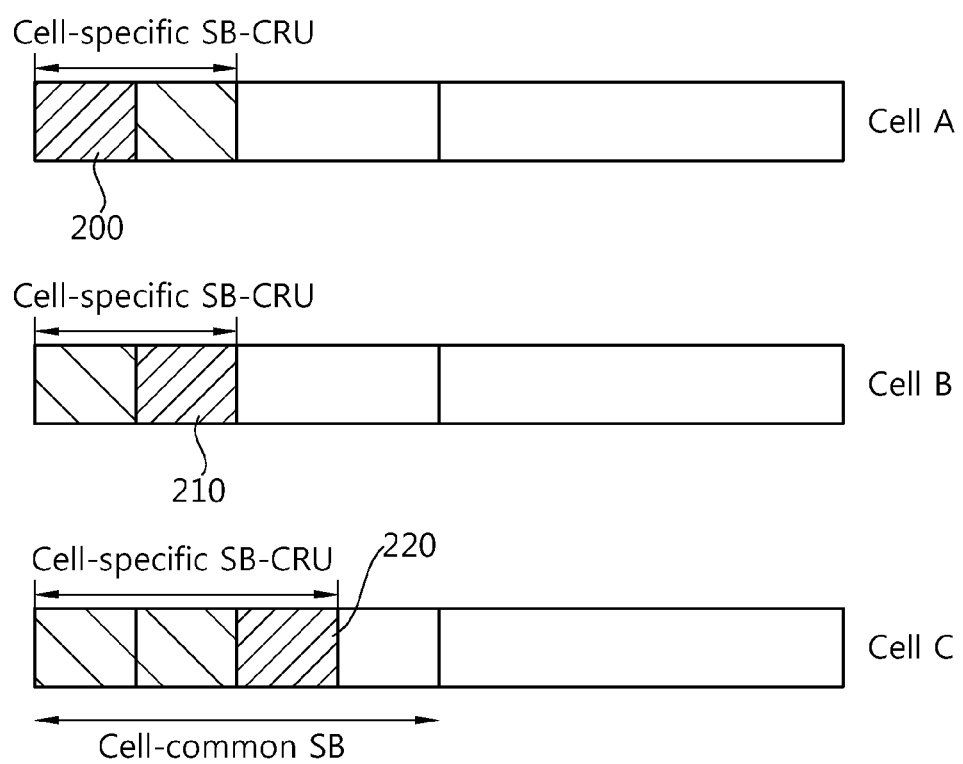
FIG. 12 shows an example of a resource region according to the proposed ranging channel transmission method.

FIG. 12 shows an example of a resource region according to the proposed ranging channel transmission method.

Referring to FIG. 12, cells A, B, and C have a cell-common SB region in an uplink resource region. The cell-common SB region may be a region allocated to an SB PRU ($PRU_{SB}$) after performing the subband partitioning process of FIG. 7. In addition, an SB CRU region is allocated for each cell. The SB CRU allocated to each cell may have a different size. The cell A and the cell B have 2 SB CRUs, and the cell C has 3 SB CRUs. Ranging channels 200, 210, and 220 are allocated to SB CRU regions of the respective cells. The ranging channels 200, 210, and 220 allocated to the respective cells do not overlap in a frequency domain when the ranging channels are transmitted. The SB CRUs allocated to the ranging channels 200, 210, and 220 in the respective cells may be determined based on a cell ID according to Equation 16 above.

Meanwhile, an MB CRU may be allocated as a resource for the ranging channel.

Figure 13:
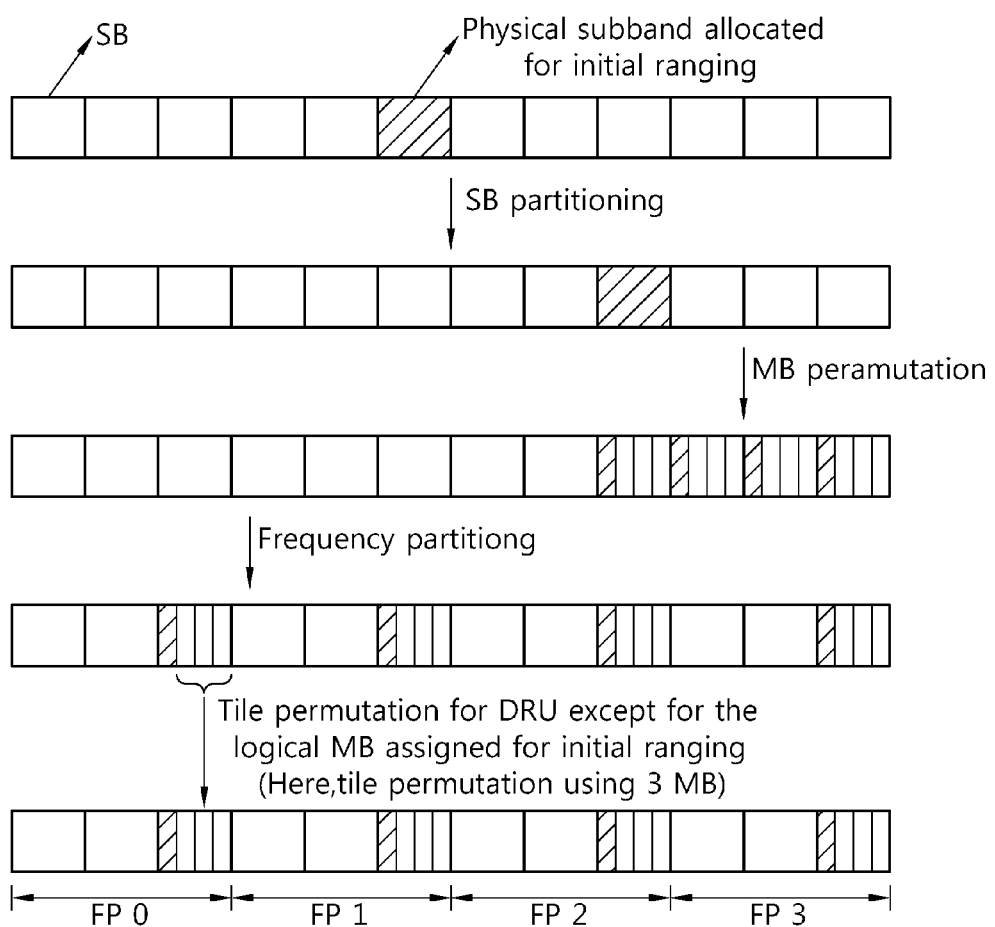
FIG. 13 shows a case where a physical subband allocated for a ranging channel is allocated to an MB CRU.

FIG. 13 shows a case where a physical subband allocated for a ranging channel is allocated to an MB CRU. In this case, an MS may exclude a ranging channel resource in a DRU permutation process. That is, in a tile permutation process, tile permutation may be performed except for a miniband for the ranging channel.

If m logical minibands exist for the ranging channel in a frequency partition, Equation 7 above can be modified to Equation 20.

$$\mathrm{Tile}(s,n,t) = L_{DRU,FPi} \cdot n + g(\mathrm{PermSeq}(\ ), s, n, t) \quad \text{[Equation 20]}$$

In Equation 20, Tile(s,n,t) denotes a tile index of an $n^{th}$ the in an $s^{th}$ DLRU of a $t^{th}$ subframe. n may be any one value ranging from 0 to 2. t is a subframe index. s is a DLRU index having any one value ranging from 0 to $L_{DRU,FPi}-1-m$. That is, tile permutation is performed except for an MB CRU allocated to the ranging channel. The remaining resources except for the ranging channel resource may be re-indexed in the logical region, or may have the same index as a subframe without the ranging channel.

If the ranging channel resource is not additionally reserved as described above, there is no restriction in the operation of a plurality of frequency partitions by the use of an FFR scheme or the like. Alternatively, even if N subbands are reserved for the ranging channel, a resource can be reserved while preventing resources from overlapping between sectors by using the FFR scheme. In addition, the ranging channel resource may be constrained to any one of an SB CRU or an MB CRU. That is, the ranging channel can be allocated only in a subband-based CRU of each cell. Alternatively, in a resource mapping process, the ranging channel resource may be limited to a part of a subband reserved for a miniband permutation process.

Meanwhile, there is a case where an index of a subband in a physical resource before the subband partitioning process and an index of a subband allocated to an SB PRU ($PRU_{SB}$) after the subband partitioning process are misaligned to each other according to a subband partitioning rule. That is, if it is assumed that a subband includes N1 PRUs, N1 PRUs constituting a certain subband allocated to a $PRU_{SB}$ may be PRUs not contiguous in a physical resource region. For example, in FIG. 7, PRUs 0 to 3 of a $PRU_{SB}$ may be mapped to PRUs 4, 5, 8, and 9 rather than contiguous PRUs 4 to 7 of a physical resource. In this case, the ranging channel may be allocated only to a subband in which a PRU included in a corresponding physical resource subband among subbands of the physical resource is not allocated to a subband of a plurality of $PRU_{SB}$ in the subband partitioning process.

Figure 14:
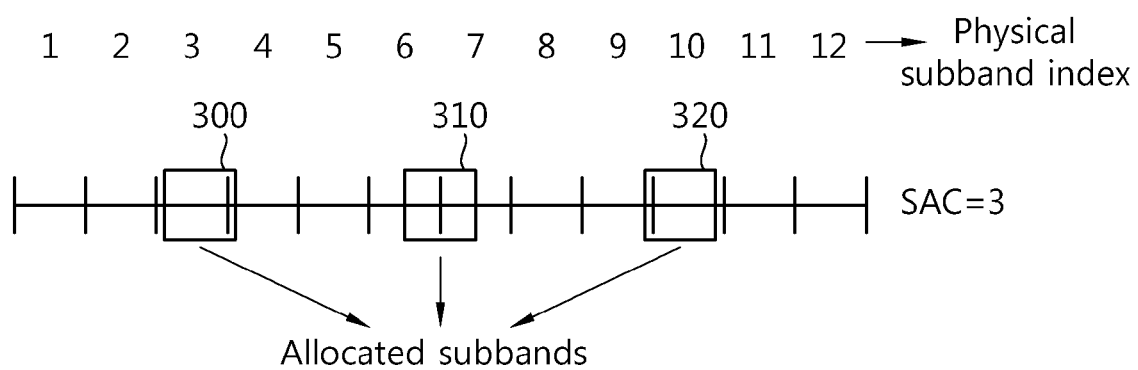
FIG. 14 shows an example of ranging channel resource allocation proposed in the present invention.

FIG. 14 shows an example of ranging channel resource allocation proposed in the present invention. Subbands of a physical resource region may be respectively indexed with 1 to 12. The subbands of the physical resource region are allocated to a $PRU_{SB}$ after performing a subband partitioning process. Some subbands of the $PRU_{SB}$ allocated by the subband partitioning process are mapped from PRUs of a plurality of subbands in the physical resource region. For example, a first allocated subband 300 is mapped from a subband indexed with 3 and a subband indexed with 4 in the physical resource region. A second allocated subband 310 is mapped from a subband indexed with 6 and a subband indexed with 7 in the physical resource region. A third allocated subband 320 is mapped from a subband indexed with 9 and a subband indexed with 10 in the physical resource region. The ranging channel may be allocated to subbands remaining after excluding certain subbands having indices across which the allocated subbands exist. That is, subbands indexed with 1, 2, 5, 8, 11, and 12 may be allocated to a ranging channel resource. Alternatively, in the physical resource region, subbands having indices across which the allocated subbands exist may be allocated to the ranging channel by regarding these subbands as one subband. In this case, 3 subbands may be additionally allocated to the ranging channel resource. An index of an additionally allocated subband may be a smaller index between indices across which resources exist. That is, subbands indexed with 1, 2, 3, 5, 6, 8, 9, 11, and 12 may be allocated to the ranging channel resource.

According to the present invention, when a resource region is divided into a SB and a MB and is also divided into a plurality of frequency partitions, a subband index of a ranging channel resource for allocating a ranging channel can be determined without additional signaling.

The present invention can be implemented using hardware, software, or a combination of them. In the hardware implementations, the present invention can be implemented using an Application Specific Integrated Circuit (ASIC), a Digital Signal Processor (DSP), a Programmable Logic Device (PLD), a Field Programmable Gate Array (FPGA), a processor, a controller, a microprocessor, other electronic unit, or a combination of them, which is designed to perform the above-described functions. In the software implementations, the present invention can be implemented using a module performing the above functions. The software can be stored in a memory unit and executed by a processor. The memory unit or the processor can use various means which are well known to those skilled in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. An apparatus for transmitting a ranging channel in a wireless communication system, the apparatus comprising:
   a radio frequency (RF) unit configured to at least transmit or receive a radio signal; and
   a processor coupled to the RF unit and configured to allocate the ranging channel to one ranging subband of a frequency domain, the one ranging subband determined based on a cell identifier (ID) of a cell and a number of allocated subbands, the number of allocated subbands determined based on a number of allocated subband contiguous resource units (CRUs),
   wherein the ranging subband has an index calculated by the equation:

$$I_{SB} = \mathrm{mod}(\mathrm{cellID}, X_{SB}),$$

wherein $I_{SB}$ indicates subband indices $0, \ldots, X_{SB}-1$ among $X_{SB}$ subbands of the frequency domain, wherein cellID indicates the cell ID of the cell,
wherein cellID is an integer from 0 to 767,
wherein $X_{SB}$ indicates the number of allocated subbands, and
wherein mod (cellID, $X_{SB}$) is a remainder obtained by dividing the cell ID of the cell by $X_{SB}$.

2. The apparatus of claim 1, wherein the number of allocated subbands or the number of allocated subband CRUs is either broadcast or indicated by another signal.

3. The apparatus of claim 1, wherein the number of allocated subbands varies depending on a system bandwidth.

4. The apparatus of claim 1, wherein the one ranging subband comprises a plurality of contiguous physical resource units (PRUs).

5. The apparatus of claim 4, wherein a number of the plurality of contiguous PRUs is 4.

6. A method for transmitting a ranging channel in a wireless communication system, the method comprising:
    allocating the ranging channel to one ranging subband of a frequency domain, the one ranging subband determined based on cell identifier (ID) of a cell and a number of allocated subbands the number of allocated subbands determined based on a number of allocated subband contiguous resource units (CRUs); and
    transmitting the ranging channel,
    wherein the one ranging subband has an index calculated by the equation;

$$I_{SB} = \mathrm{mod}(cellID, X_{SB}),$$

wherein $I_{SB}$ indicates subband indices $0, \ldots, X_{SB}-1$ among $X_{SB}$ subbands of the frequency domain,
wherein cellID indicates the cell ID of the cell,
wherein cellID is an integer from 0 to 767,
wherein $X_{SB}$ indicates the number of allocated subbands, and
wherein mod (cellID, $X_{SB}$) is a remainder obtained by dividing the cell ID of the cell by $X_{SB}$.

7. The method of claim 6, wherein the number of allocated subbands or the number of allocated subband CRUs is either broadcast or indicated by another signal.

8. The method of claim 6, wherein the number of allocated subbands varies depending on a system bandwidth.

9. The method of claim 6, wherein the one ranging subband comprises a plurality of contiguous physical resource units (PRUs).

10. The method of claim 9, wherein a number of the plurality of contiguous PRUs is 4.

* * * * *